United States Patent [19]

Vollbehr

[11] 3,837,688
[45] Sept. 24, 1974

[54] JOINT CONSTRUCTION AND METHOD OF MAKING THE SAME OR THE LIKE

[75] Inventor: Harald E. Vollbehr, Irwin, Pa.

[73] Assignee: Robertshaw Controls Company, Richmond, Va.

[22] Filed: July 9, 1973

[21] Appl. No.: 377,602

Related U.S. Application Data

[62] Division of Ser. No. 218,236, Jan. 17, 1972, abandoned.

[52] U.S. Cl. ............... 285/177, 29/474.4, 29/474.6, 285/297, 285/287
[51] Int. Cl. ........................................... F16l 25/00
[58] Field of Search .......... 285/287, 294, 297, 177; 138/171; 29/474.4, 474.6

[56] References Cited
UNITED STATES PATENTS

| | | | |
|---|---|---|---|
| 2,460,668 | 1/1949 | Wurzburger | 285/287 X |
| 2,504,625 | 4/1950 | Barnhart | 285/287 |
| 2,674,105 | 4/1954 | Prosek | 285/287 X |

*Primary Examiner*—Dave W. Arola
*Attorney, Agent, or Firm*—Candor, Candor & Tassone

[57] ABSTRACT

A first tubular metallic member has a relatively small transverse cross section and has a portion thereof telescopically disposed within a reduced portion of a second tubular metallic member, the reduced portion of the second tubular member having an opening therethrough and leading to a spacing between the telescoped portions. A heated securing means, such as a brazing material or a soldering material, is disposed in the opening and fills at least part of the spacing between the telescoped portions to secure the telescoped portions together whereby the heat affected area of the first tubular member is confined inside the telescoping portion of the second tubular member, causing the heated portion of the first tubular member to retain substantially its original strength.

12 Claims, 3 Drawing Figures

PATENTED SEP 24 1974 3,837,688

JOINT CONSTRUCTION AND METHOD OF MAKING THE SAME OR THE LIKE

This is a continuation of application Ser. No. 218,236, filed Jan. 17, 1972, now abandoned.

This invention relates to an improved joint construction as well as to an improved method for making such a joint construction or the like.

It is well known that when it is desired to attach a relatively small diameter capillary tube to a larger tubular member by utilizing a heated securing material, such as a brazing or soldering material, the heat affected area of the small diameter capillary tubular member tends to lose its strength and is a cause of subsequent failure of the completed device because of the likelihood of a subsequent fracture at the joint area between the two tubular members. For example, such adverse securement of a small diameter capillary metallic tubular member to a larger metallic tubular member is found when it is desired to attach a capillary tube to a condition responsive bulb arrangement.

However, according to the teachings of this invention, it has been found that if the heat affected area of the small tubular member is completely confined within a reduced portion of the larger tubular member, the resulting joint construction does not have the aforementioned adverse effect because the heat affected portion of the small tubular member is found to retain substantially its original strength.

In particular, one embodiment of this invention provides a joint construction wherein the tubular metallic member having the relatively small transverse cross section is telescoped within a reduced portion of the larger tubular metallic member. The reduced portion has an opening therethrough and leading to the spacing between the telescoped portions. The securing means is disposed in the opening and fills at least part of the space between the telescoped portions to secure the same together whereby the heat affected area of the telescoped portion of the small tubular member is completely confined inside the reduced portion of the larger tubular member, causing the telescoped portion of the smaller member to retain substantially its original strength.

Therefore, it is an object of this invention to provide an improved joint construction having one or more of the novel features set forth above or hereinafter shown or described.

Another object of this invention is to provide an improved method for making such a joint construction or the like.

Other objects, uses and advantages of this invention are apparent from a reading of this description, which proceeds with reference to the accompanying drawings forming a part thereof and wherein.

Figure 1:
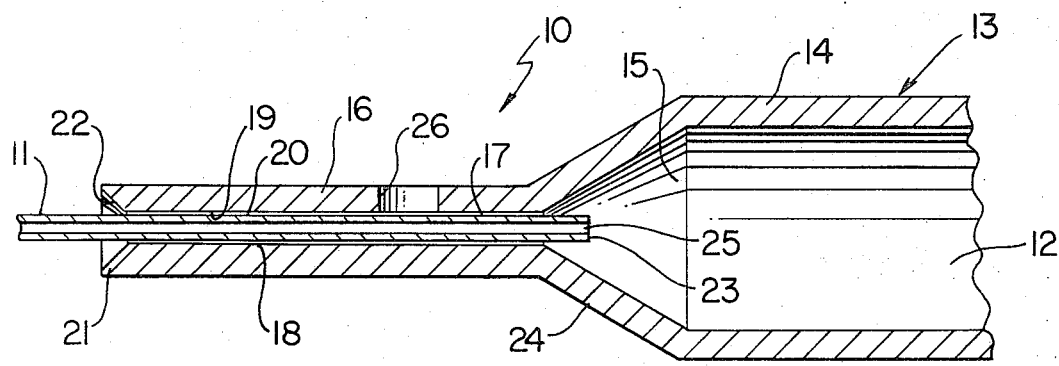
FIG. 1 is an enlarged, fragmentary, cross-sectional view illustrating one of the steps of the method of this invention for making the joint construction of this invention.

While the various features of this invention are hereinafter described and illustrated as being particularly adapted for providing a joint construction for interconnecting a capillary tube to a condition sensing bulb, it is to be understood that the various features of this invention can be utilized singly or in any combination thereof to provide a joint construction for other devices as desired.

Therefore, this invention is not to be limited to only the embodiment illustrated in the drawings, because the drawings are merely utilized to illustrate one of the wide variety of uses of the invention.

Figure 2:
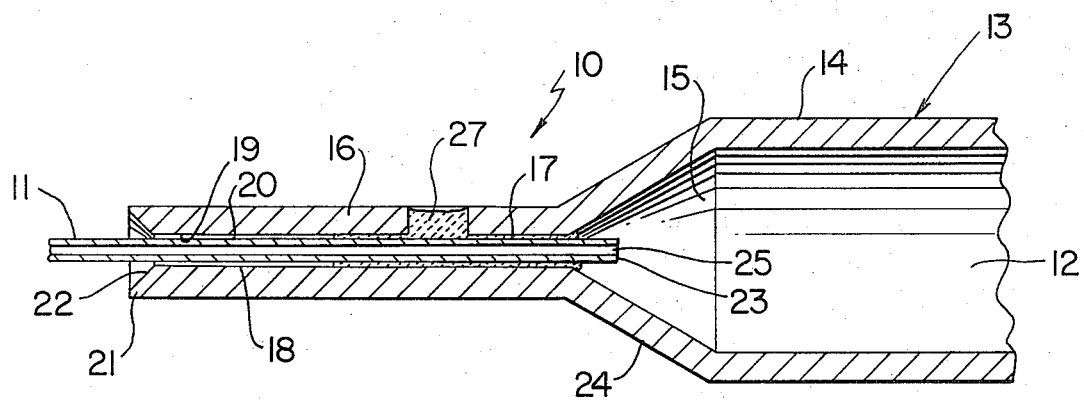
FIG. 2 is a view similar to FIG. 1 and illustrates the completed joint construction of this invention.
Figure 3:
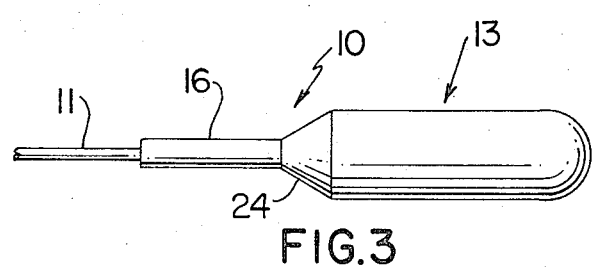
FIG. 3 is a reduced side view of the completed joint construction.

Referring now to FIGS. 1 and 2, the improved joint construction of this invention is generally indicated by the reference numeral 10 and comprises a small diameter metallic tubular member 11, such as the capillary tube 11 illustrated in FIG. 3 that is fluidly interconnected to the interior 12 of a condition sensing bulb means 13 comprising a relatively large diameter metallic tubular member 14 having the open end 15 thereof reduced in diameter to produce a reduced portion 16 that is adapted to telescope over the end portion 17 of the capillary tubular member 11 as illustrated in FIG. 1 to define a slight spacing 18 between the internal peripheral surface 19 thereof and the external peripheral surface 20 of the tubular member 11. In order to facilitate the insertion of the capillary tube 11 into the reduced portion 16 of the relatively large tubular member 14, the free end 21 of the reduced portion 16 can be provided with a chamber 22 leading to the internal peripheral surface 19 thereof as illustrated.

Also, in forming the joint construction 10, the right-hand free end 23 of the capillary tubular member 11 can project within the necked-in portion 24 of the tubular member 14 that leads to the reduced portion 16 thereof so that the opening 25 at the end 23 of the capillary tube 11 will not become clogged with the securing means subsequently utilized to secure the two members 11 and 14 together.

In particular, the reduced portion 16 of the relatively large tubular member 14 has an opening 26 passing therethrough so as to lead to the spacing 18 between the telescoped portions of the tubular members 11 and 14 as illustrated in FIG. 1.

After the members 11 and 14 have been assembled together in the manner illustrated in FIG. 1, a securing material 27 can be disposed through the opening 26 of the reduced portion 16 of the large tubular member 14 to at least fill into part of the spacing 18 between the members 11 and 14 as illustrated in FIG. 2 to secure the same together, the securing material 27 being a solder material or a brazing material whereby it can be seen that the telescoped portion of the small tubular member 11 will have the heat affected area thereof that is contacted by the securing material 27 completely confined within the reduced portion 16 of the large tubular member 14. In this manner, it has been found that the confining of the heat affected area of the capillary tube 11 within the reduced portion 16 of the large tubular member 14 provides the joint construction 10 in an improved manner because it has been found that the strength of the heat affected portion of the tubular member 11 is at substantially its original strength whereas if the tubular member 11 were fastened to the tubular member 14 at an external location thereon, the heat affected area of the tubular member 11 would be reduced by suvh heat securing operation.

Therefore, it can be seen that it is relatively simple to provide the improved joint co struction 10 of this invention by utilizing the method steps of this invention for securing the small diameter tubing to the larger diameter tubing while maintaining tube strength and joint integrity even though using brazing and soldering securing processes.

While the form of the invention now preferred has been described as required by the patent statute, other forms may be utilized, all coming within the scope of the appended claims.

What is claimed is:

1. In combination, a first tubular metallic member having a relatively small transverse cross section and opposed terminal ends whereby said first tubular member comprises a capillary tube, a second tubular metallic member having a reduced portion telescopically receiving a portion of said first tubular member therein with a spacing therebetween, said second tubular member comprising a condition sensing bulb, said second tubular member having a portion larger than said reduced portion immediately adjacent said reduced portion thereof, said first tubular member having said terminal ends thereof, respectively, extending beyond said reduced portion whereby one terminal end of said first tubular member is disposed spaced from said reduced portion and inside said larger portion of said second tubular member, said reduced portion of said second tubular member having an opening therethrough and leading to said spacing between said portions, and securing means disposed in said opening and filling at least part of said spacing while securing said portions together in said telescoped relation thereof whereby the spacing of said one terminal end of said first tubular member inside said second tubular member assures that said securing means will not clog said one terminal end thereof and whereby said securing means secures said capillary tube to said condition sensing bulb to complete a joint construction therebetween.

2. A combination as set forth in claim 1 wherein said securing means comprises a heated material whereby the heat affected area of said portion of said first tubular member is confined inside said reduced portion of said second tubular member causing said portion of said first tubular member to retain substantially its original strength.

3. A combination as set forth in claim 2 wherein said securing means is selected from the group consisting of brazing and soldering materials.

4. A combination as set forth in claim 1 wherein said reduced portion of said second tubular member comprises one end of said second tubular member.

5. A combination as set forth in claim 1 wherein said larger portion of said second tubular portion comprises a closed bulb portion with said one terminal end of said first tubular member disposed in said bulb portion.

6. A method for making a joint construction between a capillary tube and a condition sensing bulb comprising the steps of providing said capillary tube as a first tubular metallic member having a relatively small transverse cross section and terminal ends, providing said bulb as a second tubular metallic member, forming an opening through said second tubular member providing said second tubular member with a large portion and a portion of reduced size relative thereto, telescoping a portion of said first tubular member within said reduced portion of said second tubular member in such a manner that said opening leads to a spacing between said telescoped portions and one terminal end of said first tubular member is disposed spaced from said reduced portions of said second tubular member and is disposed inside said large portion of said second tubular member that is immediately adjacent said reduced portion thereof, and disposing securing means in said opening to fill at least part of said spacing while securing said portions together in said telescoped relation thereof whereby the spacing of said one end of said first tubular member inside said second tubular member assures that said securing means will not clog said one terminal end thereof and whereby said securing means secures said capillary tube to said condition sensing bulb to complete said joint construction therebetween.

7. A method as set forth in claim 6 wherein said securing means comprises a heated material whereby the heat affected area of said portion of said first tubular member is confied inside said reduced portion of said second tubular member causing said portion of said first tubular member to retain substantially its original strength.

8. A method as set forth in claim 7 and including the step of selecting said securing means from the group consisting of brazing and soldering materials.

9. A method as set forth in claim 6 and including the step of forming said reduced portion of said second tubular member by reducing a portion of said second tubular member.

10. A method as set forth in claim 9 wherein said step of forming said reduced portion of said second tubular member comprises the step of reducing one end of said second tubular member.

11. A method as set forth in claim 10 and including the step of forming said portion of said first tubular member from one end of said first tubular member.

12. A method as set forth in claim 6 and including the step of forming said larger portion of said second tubular member into a closed bulb portion whereby said one end of said first tubular member is disposed in said bulb portion.

* * * * *